ated June 28, 1966

3,258,331
PROCESS FOR BENEFICIATING MANGANESE-CONTAINING MATERIALS BY ROASTING A MIXTURE OF SAID MATERIAL, AMMONIUM CHLORIDE AND/OR SULFATE OR SULFITE SALTS UNDER PRESSURE
Philip L. Jones, Joplin, Mo., assignor to Bruce Williams
No Drawing. Filed Sept. 18, 1963, Ser. No. 309,897
8 Claims. (Cl. 75—97)

This invention relates to a new process for recovering manganese from manganese-containing materials such as ores or slags.

The subject process is an improvement of the processes having the same general purpose, disclosed in the patents to the co-patentees, William Stephen Stringham and Glenn Nelson Summers, Numbers 2,724,645 and 2,724,646, patented November 22, 1955.

Both of these patents disclose the general hydrometallurgical process for recovering manganese, comprising roasting a manganese-containing material with a reagent selected from the following group: ammonium sulfate, ammonium bisulfate, ammonium sulfite, ammonium bisulfite, or mixtures thereof in combination with ammonium chloride, leaching the soluble compounds resulting with water, and recovering the soluble manganese from the solution.

The process of the first of the above patents is particularly advantageous for processing soft pulverulent ores and ores containing impurities such as iron and phosphorus. Such impurities are not appreciably solubilized by the process and are readily separated out in the leach. The elimination of these contaminants had, prior to the process, been economically unfeasible because of high cost and low recovery.

Although the process of the first patent can be practically employed with manganese-containing minerals substantially free of silica content, manganese recovery, though generally higher than that obtained in prior processes, is adversely affected by the presence of manganese chemically combined with silica, alumina, complex iron compounds, and the like, or which, though in the form of the oxide, is in highly intimate solid solution with silica, silicates, aluminates or other complex insolubles.

The object of the process of the second patent is to include an ammonium fluoride salt, namely, ammonium fluoride or ammonium bifluoride or mixtures of both in the roast along with the ammonium sulfate or sulfite salts and the ammonium chloride, employed as reagents in the roast in the first patent. The function of the fluoride salts in the actual metallurgical recovery of the manganese resides in their action with some of the refractory insoluble components whereby the manganese is released in such condition that it is amenable to reaction with the ammonium chloride and the ammonium sulfate or sulfite salts with resulting increased recovery of manganese.

It is notable that in the roasting step in both Patents 2,724,645 and 2,724,646, the reactions were conducted at a temperature at which any manganese dithionate formed will be decomposed, and a minimum roasting temperature of above 850° F. is preferred because of the elimination of dithionate at such temperatures and the rapidity of the reaction obtained. Manganese dithionate is a compound formed under certain conditions by the action of sulfurous acid or sulfur dioxide on manganese dioxide, and it is not amenable to ready recovery of the managanese from solutions.

I have discovered that if the roast reactions are carried on in a sealed vessel, the pressures developed by the gases given off in the reaction within the vessel permit the use of a lower roast temperature than 850° F., under which conditions manganese dithionate does not form. I have found that a roast temperature of 650° F. will develop a pressure of about 275 p.s.i. in the sealed vessel and that under these conditions manganese dithionate will not be formed. The reactions within the vessel are characterized by the substantial absence of dithionate throughout a temperature range from at least 500° F. to less than 850° F., and generally 500°–800° F., producing a desirable pressure range of from 275 p.s.i. to about 500 p.s.i.

It is therefore one of the objects of the present invention to provide a new process for recovering manganese from manganese-containing materials which employs a roasting step in which the materials are heated in a sealed vessel together with the reagents specified in either of the above patents, including in all cases, ammonium chloride, at a temperature sufficiently high to develop reaction pressure in the vessel, under which pressure it is possible to obtain a higher recovery of water soluble compounds of manganese than in the processes of said patents, by the use of a roasting temperature lower than the decomposition point of manganese dithionate, without the formation of the dithionate in the reaction. The use of the lower temperatures with corresponding pressures results in other substantial economies.

Other objects of the invention will appear as the following detailed description of the invention proceeds.

Under the conditions of roasting set forth, the objective reaction products are manganese sulfate and manganese chloride, both soluble compounds in water, which are subjected to leaching in water and then to recovery of the manganese from the solution. Since iron and phosphorus impurities are substantially insoluble, they are readily separated from manganese.

The reactions that occur, employing manganese oxides of various valencies, with ammonium sulfate and ammonium chloride as reagents, are as follows:

$2MnO_2 + 2(NH_4)_2SO_4 + 4NH_4Cl = 2MnSO_4$
$\phantom{2MnO_2} + O_2 + 4NH_3 + 2H_2O + 4NH_4Cl$
$2MnO_2 + 2(NH_4)HSO_4 + 4NH_4Cl = 2MnSO_4$
$\phantom{2MnO_2} + O_2 + 2NH_3 + 2H_2O + 4NH_4Cl$
$2MnO_2 + 2(NH_4)_2SO_3 + 4NH_4Cl = 2MnSO_4$
$\phantom{2MnO_2} + 4NH_3 + 2H_2O + 2NH_4Cl$
$MnO_2 + (NH_4)HSO_3 + 2NH_4Cl = MnSO_4$
$\phantom{MnO_2} + NH_3 + H_2O + 2NH_4Cl$
$2Mn_2O_3 + 4(NH_4)_2SO_4 + 8NH_4Cl = 4MnSO_4$
$\phantom{2Mn_2O_3} + O_2 + 8NH_3 + 4H_2O + 8NH_4Cl$
$MnO + 2NH_4Cl = MnCl_2 + 2NH_3 + H_2O$ In the first five of the above equations, in which the manganese oxides are subject of treatment, it is to be noted that the ammonium chloride is shown in equal amounts on both sides of the equation. As stated in both of the afore-mentioned patents, the reason for this is not definitely ascertained, but it is likely that the ammonium chloride has acted as a catalyst, since with its presence the dissolution of manganese oxides is appreciably enhanced. The fifth equation, which has been copied from Patent No. 2,724,645 shows that the ammonium chloride combines directly with the manganous oxide to form manganese chloride which is water soluble.

Therefore, the inclusion of ammonium chloride as a reagent is advantageous not only in treating manganese material in the lower state of oxidation, but also when some or all of the material comprises higher oxides.

In the case of manganese materials which are themselves silicates or intimately mixed with refractory insolubles such as silica, silicates, aluminates or the like, and ammonium fluoride salts are employed as an additional reagent, the ammonium fluoride salts react with silicates as follows:

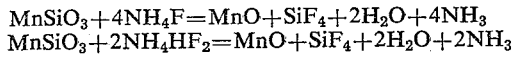
$$MnSiO_3 + 4NH_4F = MnO + SiF_4 + 2H_2O + 4NH_3$$
$$MnSiO_3 + 2NH_4HF_2 = MnO + SiF_4 + 2H_2O + 2NH_3$$

The manganese oxide then reacts with the ammonium sulfate/sulfite salts and ammonium chloride to give soluble manganese sulfate. The silicon tetrafluoride is recovered in absorption towers with ammonium hydroxide and reacts with it as follows:

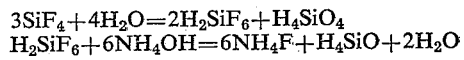
$$3SiF_4 + 4H_2O = 2H_2SiF_6 + H_4SiO_4$$
$$H_2SiF_6 + 6NH_4OH = 6NH_4F + H_4SiO + 2H_2O$$

The ammonium fluoride is thus recovered and recycled.

The details for carrying out the process of the present invention are as follows:

The ore or manganese bearing material is crushed to a size that is economically feasible, usually about 80 to 100 mesh, and then mixed with a small quantity of water and the reagents, and the mass is pelletized. The reagents are in the amounts to satisfy the reactions plus an excess up to 60%. The pellets are charged into a furnace vessel so that they fill it. The vessel communicates with a smaller vessel or sump in which the gaseous products of the reaction, water, ammonia, with or without silicon tetrafluoride may condense outside the heating zone. The furnace vessel and pump are sealed and are constructed so as to retain pressures up to 600 lbs. per sq. inch at a temperature of 750° F. The furnace vessel is heated by suitable means, so that the charge inside is raised to about 650° F. and maintained at temperature about two hours. In this roasting step the manganese material is transformed into manganese sulfate with release of ammonia and water with or without silicon tetrafluoride.

After the reaction is completed the gases present are absorbed in an absorption column and join the ammoniacal liquor from the sump. The ore charge is removed from the furnace vessel and made up with circuit solution to a density of about 1.3 and agitated from 3 hours at a pH of 6.95. This oxidizes small amounts of dissolved iron together with phosphorus. The pulp is then leached by counter-current decantation using a final water wash, so that a concentrated solution of manganese sulfate with residual reagents is obtained. The insoluble residue containing undissolved iron, phosphorus, silica, aluminates, and other rock minerals and containing only a small percent of manganese is discarded as final tailings.

The concentrated solution of manganese sulfate and residual reagents is treated with ammonium carbonate solution. The ammonium carbonate is made by the action of carbon dioxide gas on the ammonia formed in the roasting reaction. The manganese in solution is thereby precipitated as insoluble manganese carbonate with the formation of ammonium salts. The solution remaining after the manganese carbonate has been filtered off, is evaporated to produce a cycle salt consisting of the mixed ammonium salts which were added as reagents to the furnace charge, and which is returned to the reaction furnace as reagent for further charges. The process is therefore completely cyclic with respect to all reagents, and losses of reagents that have to be currently made up are due generally to the usual waste deriving from the washing of soluble reagents out of solid residues.

The manganese carbonate filtered from the solution is calcined at 850° F. to produce pure manganese oxides and carbon dioxide. The carbon dioxide is absorbed by ammonia produced in the furnace reaction to produce the ammonium carbonate which is to be used to precipitate the manganese from the circuit solutions. The manganese oxide produced varies in manganese content from 62% to nearly 70%, dependent upon the amount of oxidation experienced by the manganese carbonate when calcined, and contains iron of the order of 0.025%.

The optimum temperature of the roasting step of the process is 650° F., which is generally maintained throughout the roasting period. Ammonium chloride, which volatilizes at 635° F. at atmospheric pressure does not volatilize under pressure of 275 p.s.i., which is the average pressure per square inch maintained during the roasting. In consequence, the ammonium chloride is maintained unvolatilized throughout the duration of the roasting and its full beneficial effect is exerted upon the manganese containing material in the furnace vessel from the beginning to the end of the roasting period, which is in sharp contrast to former processes in which, at high temperature and at atmospheric pressure, the ammonium chloride is continuously removed from the solid charge, so that its beneficial effect becomes progressively lessened as the roasting step proceeds. This is an important function of the present invention and contributes to the higher recoveries of manganese from comparable ores that characterize the present process compared with the specific earlier processes upon which it is an improvement.

Other economies made possible by my improved process are the use of less heat; avoidance of the necessity of condensing and re-solidifying the ammonia chloride which is an expensive and troublesome operation; and the use of less make-up ammonium chloride, due to the non-disassociation of ammonia formed in the reaction. Due to the type of furnace reaction, the gangue material, mostly silica, silicates and iron materals, are not altered by high temperature into a form which, when wetted with water, becomes a semi-colloidal material, which filters with great difficulty, as in the original processes.

The following are specific examples of my new process:

*Example 1.*—Showing that manganese sulfate and not manganese dithionate is formed:

Material—"Batesville" hard ore of the following assay:

| | Percent by weight |
|---|---|
| Manganese | 26.93 |
| Silica | 11.40 |
| Phosphorus | 0.35 |
| Iron | 21.80 |

This was dried at 105° C. and crushed dry to —80 mesh. A mixture of 60 grams of ore with 71.7% of ammonium sulfate and 75.0% of ammonium chloride and 18.5% water were mixed in a rotary mixer for two minutes and pelletized into half inch pellets. 100 grams of the pellets were charged into the main chamber of an autoclave which just contained the pellets after a moisture sample was taken on the pellets as charged. The autoclave was fitted with a pipe that led to a smaller chamber or sump so arranged that the larger chamber could be heated in the furnace and the sump could be outside the furnace. This autoclave was fitted with a pressure gauge and when closed was capable of withstanding 600 lbs. per sq. inch pressure inside when heated to a temperature of 750° F. The autoclave was placed in a muffle furnace so that the larger chamber was inside the muffle and the sump outside and in an upright position. A pyrometer was placed beside the larger chamber. The furnace was heated until the pyrometer registered 650° F., the heating of the muffle being controlled automatically, so that the heating of the muffle was maintained as evenly as possible at 650° F. The heating was continued for two hours. The pressure developed in the autoclave during the reaction was registered continuously and averaged 275 lbs. per sq. inch. The products of this reaction were as follows: (a) solid furnace residue of pellets comprising 82.0% by weight of charge and containing residual reagents, water soluble manganese salts and gangue material; (b) liquid in the sump that condensed from the reaction, 15.4% by weight of the charge, containing water derived from that added, from that produced by the reaction and that driven off from hydrated minerals present in the feed, with dissolved ammonia and a very small amount of dust brought over by the condensate, and (c) ammonia gas comprising 2.6% by weight of the charge. The solid residue (a) was leached with 200 mls. of water, washed four times with 200 mls. of water, and the solutions metered and assayed for all dissolved constituents. The insoluble residue of the leach, comprising 21.5% by weight of the charge was tailing and carried only 4.6% of the manganese present, the balance being in the solution. The above procedure was repeated on exactly similar tests to obtain a check run and the following results are composite of the two runs. The composition of the solution was as follows:

|  | Grs. |
|---|---|
| Manganese | 19.49 |
| Iron | .98 |
| Ammonium ($NH_4$) | 22.00 |
| Sulfur | 13.28 |
| Chlorine | 40.46 |

From these figures the composition of the solution in terms of dissolved salts present was calculated by the usual method of chemical equivalents as follows: the manganese was calculated to manganese sulfate, $MnSO_4$; the iron to ferrous sulfate, $FeSO_4$; the chlorine to ammonium chloride, $NH_4Cl$ and the remaining ammonium to ammonium sulfate $(NH_4)_2SO_4$. The balance not accounted for was a trace of sulfur. The results were:

|  | Grs. |
|---|---|
| Calculating manganese to manganese sulfate | 53.57 |
| Calculating iron to ferrous sulfate | 2.67 |
| Calculating chlorine to ammonium chloride | 61.05 |
| Calculating remaining ammonium to ammonium sulfate | 5.16 |
| Balance, sulfur not accounted for | .08 |

From these results which balance up all constituents with a small unaccountable balance which is within the limits of experimental error, it was proved that the manganese was not present as a dithionate, $MnS_2O_6$, but as manganese sulfate. This can be looked at another way as follows. The amount of sulfur present after satisfaction of the iron as ferrous sulfate available for combining with manganese was 11.23 grs. The amount of sulfur that would be needed to form manganese sulfate is 11.37 grs., while that necessary to form manganese dithionate is 22.75 grs. Thus, dithionate was not present.

*Example 2.*—Showing final recovery obtained: Similar procedure to that of Example 1 was followed up to the end of the furnace reaction. The furnace charge was made up to a pulp of 1.3 density with water and agitated for three hours at a pH controlled at 6.95 by the addition of ammonia or sulfuric acid. The pulp was then filtered and washed with four washes and the solution obtained was precipitated by a slight excess of ammonium carbonate solution, 25% strength. Manganese carbonate precipitated as a pinkish white precipitate. The manganese carbonate was filtered, washed four times with 50 mls. of water. It was dried at 100° C., transferred to a porcelain crucible and calcined, covered, at a temperature of 850° F. for thirty minutes, when a brown calcine of manganese oxides was obtained. The results of weighing and assaying were as follows:

| Weight of original ore treated in furnace | grs. | 38.43 |
|---|---|---|
| Percent manganese in original ore | percent | 26.93 |
| Weight of manganese in original ore | grs. | 10.35 |
| Weight of calcine | grs. | 14.25 |
| Percent manganese in calcine | percent | 69.77 |
| Percent iron in calcine | do | .03 |
| Percent phosphorus in calcine | do | .00 |
| Percent silica in calcine | do | .05 |
| Weight of manganese in calcine | grs. | 9.94 |
| Percent manganese recovered in calcine | percent | 96.00 |

*Example 3.*—Showing effect of addition of ammonium bifluoride: A similar procedure to Example 1 was followed, except that the reactive mixture was made up as follows: 100 grams of ore, 71.0 grams of ammonium chloride, 3.3 grams of ammonium bifluoride, and 18.8 grams of water. Similar procedure to that in Example 1 was followed and the recovery determined by assay and weighing of residue was: Recovery of manganese 97.64%.

*Example 4.*—Showing that ammonia is not dissociated into nitrogen during reaction: Similar procedure to that in Example 1 was followed during reaction, except that 10 mls. of 20% sulfuric acid was added to the sump before the autoclave was closed to absorb the ammonia given off. At the end of the reaction the autoclave was removed from the muffle with the sump vertical and cooled. The autoclave was connected to an absorption tower containing 10% sulfuric acid, through a valve. The valve was then opened and the gas present was allowed to exhaust slowly to atmospheric pressure. The valve was then closed and nitrogen gas under 100 lbs. per sq. inch was pumped into the autoclave. The valve was then closed and the autoclave again connected to the absorption tower, the valve opened and the nitrogen gas carrying any residual ammonia was exhausted slowly to atmospheric pressure. The stripping operation was repeated three times. In this way the ammonia gas was stripped from the autoclave. The autoclave was then opened and the contents metered and assayed for ammonia, together with the ammonia absorbed by the absorption tower. In this way all the ammonia that could be recovered was acounted for. It was noted that ammonia could still be smelled in the furnace residue. The results were:

| Ammonia present in original charge | grs. | 8.67 |
|---|---|---|
| Original charge of ore | grs. | 18.48 |
| Ammonia in residue | grs. | 5.83 |
| Ammonia in liquor in sump | grs. | 2.64 |
| Ammonia in absorption tower | grs. | .07 |
| Ammonia unaccounted for | grs. | .13 |
| Ammonia unaccounted for expressed as lbs. per ton of original feed | lbs. per ton | 13 |

This showed that all except a small amount of ammonia was accounted for and this loss was what would be expected, due to evaporation and absorption in solid residue. If the reaction given in Patents 2,724,645 and 2,724,646 held, in which some of the ammonia was decomposed into nitrogen, then the loss of ammonia due to this reaction would be 114 lbs. per ton of feed ore in this test.

Although this invention has been described with reference to illustrative embodiments thereof, it will be apparent to those skilled in the art that it may be embodied in other forms and still be within the scope of the invention as claimed.

I claim:
1. Process for recovering manganese from manganese-containing material which comprises roasting the material in a sealed vessel with ammonium chloride and a compound selected from the group consisting of am- monium sulfate, ammonium bisulfate, ammonium sulfite, ammonium bisulfite, and mixtures thereof, at a temperature of from approximately at least 500° F. to a temperature less than 850° F., thereby developing a pressure upon the contents of the vessel which, at the roasting temperature, inhibits the formation of manganese dithionate, and leaching the contents of the vessel with water to dissolve out the soluble manganese salts resulting from the roasting.

2. Process for recovering manganese from manganese-containing material which comprises roasting the material in a sealed vessel with ammonium chloride and a compound selected from the group consisting of ammonium sulfate, ammonium bisulfate, ammonium sulfite, ammonium bisulfite, and mixtures thereof, and with a compound selected from the group consisting of ammonium fluoride, ammonium bifluoride, and mixtures thereof, at a temperature of from approximately at least 500° F. to a temperature less than 850° F., thereby developing a pressure upon the contents of the vessel which, at the roasting temperature, inhibits the formation of manganese dithionate, and leaching the contents of the vessel with water to dissolve out the soluble manganese salts resulting from the roasting.

3. Process for recovering manganese from manganese-containing material, which comprises roasting the material in a sealed vessel with ammonium chloride and a compound selected from the group consisting of ammonium sulfate, ammonium bisulfate, ammonium sulfite, ammonium bisulfite, and mixtures thereof, at a temperature of about 650° F. and under a pressure of about 275 lbs. per sq. inch developed by the roasting, which temperature and pressure conditions inhibit the formation of manganese dithionate, and following the roasting, leaching the contents of the vessel with water to dissolve out the soluble magnesium salts resulting from the roasting.

4. Process for recovering manganese from manganese-containing material, which comprises roasting the material in a sealed vessel with ammonium chloride and a compound selected from the group consisting of ammonium sulfate, ammonium bisulfate, ammonium sulfite, ammonium bisulfite, and mixtures thereof, and with a compound selected from the group consisting of ammonium fluoride, ammonium bifluoride, and mixtures thereof at a temperature of about 650° F. and under a pressure of about 275 lbs. per sq. inch developed by the roasting, which temperature and pressure conditions inhibit the formation of manganese dithionate, and following the roasting, leaching the contents of the vessel with water to dissolve out the soluble manganese salts resulting from the roasting.

5. Process for recovering manganese from manganese-containing material, which comprises roasting the material in a sealed vessel with reagents comprising ammonium chloride and a compound selected from the group consisting of ammonium sulfate, ammonium bisulfate, ammonium sulfite, ammonium bisulfite, and mixtures thereof, heating the contents of the vessel to a controlled temperature at which reaction takes place between the materials and reagents, thereby developing pressure within the vessel, the heating being maintained throughout the period of reaction at such temperature that under the pressure developed volatilization of the ammonium chloride is inhibited.

6. Process for recovering manganese from manganese-containing material, as claimed in claim 5, the range of roasting temperature being from 650° F. to 800° F. and the pressure being about 275 lbs. per sq. inch.

7. Process for recovering manganese from manganese-containing material which comprises roasting the material in a sealed vessel with reagents comprising ammonium chloride and a compound selected from the group consisting of ammonium sulfate, ammonium bisulfate, ammonium sulfite, ammonium bisulfite, and mixtures thereof, heating the contents of the vessel to a temperature at which reaction takes place between the materials and reagents thereby developing pressure within the vessel, the heating being maintained throughout the period of reaction at such temperature that under the pressure developed volatilization of the ammonium chloride is inhibited and the formation of manganese dithionate suppressed.

8. Process for recovering manganese from manganese-containing material as claimed in claim 7, including also as reagents, a compound selected from the group consisting of ammonium fluoride, ammonium bifluoride, and mixtures thereof.

No references cited.

DAVID L. RECK, *Primary Examiner.*

N. F. MARKVA, *Examiner.*